United States Patent
Yang

(10) Patent No.: US 11,412,567 B2
(45) Date of Patent: Aug. 9, 2022

(54) ACCESS CONTROL METHOD, TERMINAL DEVICE, BASE STATION, AND STORAGE MEDIUM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/466,676

(22) Filed: Sep. 3, 2021

(65) Prior Publication Data
US 2021/0400760 A1  Dec. 23, 2021

Related U.S. Application Data

(63) Continuation of application No. PCT/CN2019/106777, filed on Sep. 19, 2019.

(51) Int. Cl.
*H04W 76/27* (2018.01)
*H04W 36/30* (2009.01)
*H04W 36/00* (2009.01)

(52) U.S. Cl.
CPC ....... *H04W 76/27* (2018.02); *H04W 36/0077* (2013.01); *H04W 36/305* (2018.08)

(58) Field of Classification Search
CPC .................. H04W 76/27; H04W 76/30; H04W 36/305; H04W 36/38; H04W 36/0077; H04W 36/0055; H04W 76/19
See application file for complete search history.

(56) References Cited

U.S. PATENT DOCUMENTS

| | | | |
|---|---|---|---|
| 10,356,677 B2 | 7/2019 | Michaelsen et al. | |
| 2014/0370915 A1* | 12/2014 | Jung | H04W 4/02 455/456.1 |
| 2017/0099621 A1 | 4/2017 | Michaelsen et al. | |
| 2017/0111932 A1* | 4/2017 | Uemura | H04L 5/0055 |
| 2020/0169925 A1* | 5/2020 | Li | H04W 36/36 |
| 2020/0196379 A1* | 6/2020 | Park | H04W 24/04 |

(Continued)

FOREIGN PATENT DOCUMENTS

| CN | 109619491 A | 5/2019 |
|---|---|---|
| CN | 110198545 A | 9/2019 |

(Continued)

OTHER PUBLICATIONS

Nokia et al., "Dual connected intra-frequency handover for 0 ms interruption and mobility robustness," 3GPP TSG-RAN WG2 #99, R2-1708588, Berlin, Germany, Aug. 21-25, 2017, pp. 1-4 (Year: 2017).*

(Continued)

*Primary Examiner* — Un C Cho
*Assistant Examiner* — Lalita W Pace
(74) *Attorney, Agent, or Firm* — Ladas & Parry LLP

(57) ABSTRACT

A method for access control, a terminal device and a base station are provided. The method includes: responsive to that a terminal device satisfies a condition of radio resource control connection reestablishment when the terminal device performs or is to perform an access procedure to a target primary secondary cell, the terminal device terminates an ongoing access to the target primary secondary cell.

8 Claims, 7 Drawing Sheets

(56) References Cited

U.S. PATENT DOCUMENTS

| | | | | |
|---|---|---|---|---|
| 2021/0235333 | A1* | 7/2021 | Saily | H04W 36/305 |
| 2021/0329723 | A1* | 10/2021 | Teyeb | H04W 48/20 |

FOREIGN PATENT DOCUMENTS

| | | | | |
|---|---|---|---|---|
| CN | 110198553 A | | 9/2019 | |
| EP | 3146759 A1 | | 3/2017 | |
| WO | 2015176738 | | 11/2015 | |
| WO | WO-2016019493 A1 | * | 2/2016 | H04W 24/00 |
| WO | WO-2018182231 A1 | * | 10/2018 | H04L 5/0007 |
| WO | 2019074429 A1 | | 4/2019 | |

OTHER PUBLICATIONS

ZTE Corporation et al. "Discussion on the RRC handling during CHO execution", 3GPP TSG RAN WG2 Meeting #106, R2-1907109, May 17, 2019 (May 17, 2019), sections 2-3.

ZTE Corporation et al. "Discussion on the RRC handling during CHO execution", 3GPP TSG RAN WG2 Meeting #106, R2-1907092, May 17, 2019 (May 17, 2019), sections 2-3.

International Search Report in the international application No. PCT/CN2019/106777, dated Jun. 22, 2020.

Supplementary European Search Report in the European application No. 19945724.3, dated Dec. 13, 2021.

LG Electronics Inc: "RRC Re-establishment Enhancement in NE-DC", 3GPP Draft; R2-1808593 Re-Establishment Enhancement for NE-DC, 3rd Generation Partnership Project (3GPP), Mobile Competence Centre ; 650. Route Deslucioles ; F-06921 Sophia-Antipolis Cedex FRANCEvol. RAN WG2, No. Busan, Republic of Korea; May 21, 2018-May 25, 2018 May 11, 2018 (May 11, 2018), XP051519986,Retrieved from the Internet:URL:http://www.3gpp.org/ftp/tsg%5 Fran/WG2%5FRL2/TSGR2%5F102/Docs/R2%2D1808593%2Ezip.

Huawei et al: "Text proposal to capture SCG failure caused by T307 expiration", 3GPP Draft; R2-145190, 3rd Generation Partnership Project (3GPP), Mobile Competence Centre ; 650, Route Deslucioles ; F-06921 Sophia-Antipolis Cedex ; FRANCEvol. RAN WG2, No. San Francisco, USA;Nov. 17, 2014-Nov. 21 Nov. 17, 2014 (Nov. 17, 2014),XPO5877280,Retrieved from the Internet: URL:http://www.3gpp.org/ftp/Meetings_3GPPSYNC/RAN2/Docs/[retrieved on Nov. 17, 2014]*the whole document.

OPPO: "PCell monitoring during conditional PSCell additon/change" 3GPP Draft; R2-1912400 LTE Conditional PSCell Change, 3rd Generation Partnership Project (3GPP), Mobile Competence CENTRE650, Route Des Lucioles ; F-06921Sophia-Anti Polis Cedex ; FRANCEvol. RAN WG2, No. Chongqing, China;Oct. 14, 2019-Oct. 18, 2019 Oct. 3, 2019 (Oct. 3, 2019), XP051803874,Retrieved from the Internet: URL:https://ftp.3gpp.org/tsg_ran/WG2_RL2/TSGR2_107bis/Docs/R2-1912400.zip R2-1912400LTE conditional PSCel.

First Office Action of the Indian application No. 202117039741, dated Apr. 25, 2022.

* cited by examiner

ACCESS CONTROL METHOD, TERMINAL DEVICE, BASE STATION, AND STORAGE MEDIUM

CROSS-REFERENCE TO RELATED APPLICATION

This is a continuation application of International Patent Application No. PCT/CN2019/106777 filed on Sep. 19, 2019, the contents of which are hereby incorporated by reference in its entirety.

TECHNICAL FIELD

The present disclosure relates to a mobile communication technology, and more particularly, to a method for access control, a terminal device, a base station and a storage medium.

BACKGROUND

In the related art, a dual connectivity (DC) function is introduced in a mobile communication system, and the DC includes two cell groups: a master cell group (MCG) and a secondary cell group (SCG). The MCG includes a primary cell (PCell) or additionally includes one or more secondary cells (SCells), and the SCG includes a primary secondary cell (PSCell) or additionally includes one or more SCells. A base station managing the MCG is referred to as a master node (MN), and a base station managing the SCG is referred to as a secondary node (SN).

When channel quality of a target primary secondary cell satisfies a trigger condition, a terminal performs addition/change of the target primary secondary cell to access the target primary secondary cell. However, a problem to be solved is how to ensure that an access of the terminal device to the target primary secondary cell does not affect a service provided by the dual connectivity for the terminal device.

SUMMARY

Embodiments of the present disclosure provide a method for access control, a terminal device, a base station and a storage medium, which can ensure that an access of the terminal device to a target primary secondary cell does not affect a service provided by the dual connectivity for the terminal device.

The technical solution of the embodiments of the present disclosure is implemented as follows.

According to a first aspect, the embodiments of the present disclosure provide a method for access control, which includes the following operations.

Responsive to that a terminal device satisfies a condition of radio resource control connection reestablishment or transfer or that the terminal device is performing radio resource control connection reestablishment or transfer, the terminal device performs the following operations.

An ongoing access to a target primary secondary cell is terminated or suspended.

Responsive to that the terminal device satisfies a first trigger condition, no access to the target primary secondary cell that is to be performed is performed.

According to a second aspect, the embodiments of the present disclosure provide a method for access control, which includes the following operations.

A base station receives from a terminal device indication information for indicating that the terminal device satisfies a first trigger condition. The first trigger condition is used to trigger the terminal device to access a target primary secondary cell, the base station covers a target primary cell accessed by the terminal device, and the target cell is accessed by the terminal device under the following conditions.

Responsive to that a condition of radio resource control connection reestablishment or transfer is satisfied or that the terminal device is performing radio resource control connection reestablishment or transfer, an ongoing access to the target primary secondary cell is terminated or suspended, or no access to the target primary secondary cell that is to be performed is performed responsive to that the terminal device satisfies the first trigger condition.

According to a third aspect, the embodiments of the present disclosure provide a terminal device, which includes an ignoring unit.

The ignoring unit is configured as an ignoring module and configured to, responsive to that a terminal device satisfies a condition of radio resource control connection reestablishment or transfer or that the terminal device is performing radio resource control connection reestablishment or transfer, terminate or suspend an ongoing access to a target primary secondary cell, or perform, responsive to that the terminal device satisfies a first trigger condition, no access to the target primary secondary cell that is to be performed.

According to a fourth aspect, the embodiments of the present disclosure provide a base station, which includes a receiving module.

The receiving module is configured to receive from a terminal device indication information for indicating that the terminal device satisfies a first trigger condition. The first trigger condition is used to trigger the terminal device to access a target primary secondary cell, the base station covers a target primary cell accessed by the terminal device, and the target primary cell is accessed by the terminal device under the following conditions.

Responsive to that a condition of radio resource control connection reestablishment or transfer is satisfied or that the terminal device is performing radio resource control connection reestablishment or transfer, an ongoing access to the target primary secondary cell is terminated or suspended, or no access to the target primary secondary cell that is to be performed is performed responsive to that the terminal device satisfies the first trigger condition.

According to a fifth aspect, the embodiments of the present disclosure provide a terminal device, which includes a processor and a memory for storing a computer program executable on the processor. The processor is configured to, when running the computer program, perform the operations of the above method for access control executed by the terminal device.

According to a sixth aspect, the embodiments of the present disclosure provide a base station, which includes a processor and a memory for storing a computer program executable on the processor. The processor is configured to, when running the computer program, perform the operations of the above method for access control executed by the base station.

According to a seventh aspect, the embodiments of the present disclosure provide a storage medium having stored an executable program which, when executed by a processor, implements the above method for access control executed by the terminal device.

According to an eighth aspect, the embodiments of the present disclosure provide a storage medium having stored an executable program which, when executed by a processor, implements the above method for access control executed by the base station.

The embodiments of the present disclosure provide the method for access control. When the terminal device satisfies the condition of radio resource control connection reestablishment or transfer or the terminal device is performing radio resource control connection reestablishment or transfer, the terminal device terminates or suspends the ongoing access to the target primary secondary cell, or does not perform the access to the target primary secondary cell that is to be performed when the terminal device satisfies the first trigger condition. Therefore, it is avoided that there is no interface between an MN covering a new primary cell and an SN covering a newly accessed primary secondary cell when the terminal device connects to the new primary cell in a scenario where a radio resource control connection changes such as radio resource control connection reestablishment or transfer, thereby avoiding that the dual connectivity cannot be implemented in the new MN, ensuring that an access of the terminal device to the target primary secondary cell does not affect the service provided by the dual connectivity for the terminal device, ensuring service performance of a network and improving user experience.

DETAILED DESCRIPTION

In order to make the objects, technical solutions and advantages of the present disclosure more clearly, the present disclosure will be described in more detail with reference to the accompanying drawings. The described embodiments should not be regarded as a limitation to the present disclosure, and all other embodiments obtained by those of ordinary skilled in the art without creative work shall fall within the scope of the present disclosure.

Before the method for access control provided by the embodiments of the present disclosure is described in detail, DC and conditional handover are briefly described.

DC

The main application scenarios of a New Radio (NR) system (which may also be referred to as a 5G system) includes enhanced mobile broadband (eMBB), ultra reliable low latency communications (URLLC), massive machine type of communication (mMTC) and other scenarios of implementing high-speed services. The eMBB aims to enable a user to obtain multimedia content, services and data, and demand of the eMBB is growing very rapidly. On the other hand, since the eMBB may be deployed in different scenarios, such as indoor, urban and rural areas, the differences in capabilities and demands thereof are quite large, so it cannot be generalized and must be analyzed in detail in combination with the specific deployment scenario. Typical applications of the URLLC include industrial automation, power automation, telemedicine operations (surgery), traffic safety guarantee and the like. Typical features of the mMTC include high connection density, small data amount, time delay insensitive services, low cost and long service life of modules and the like.

Figure 1:
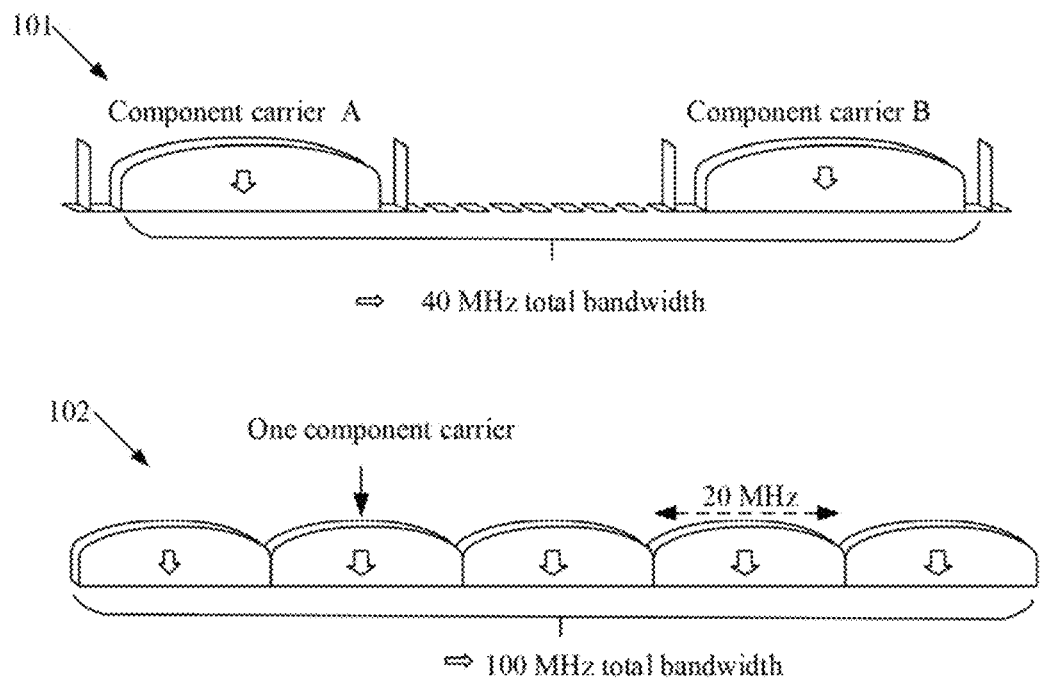
FIG. 1 is an alternative process flow diagram of carrier aggregation according to the present disclosure.

To satisfy the demands of high-speed services, the carrier aggregation (CA) technology is supported in the 5G. The CA is to jointly schedule and use resources on multiple component carriers (CCs), so as to enable the 5G system to support a larger bandwidth, thereby achieving a higher system peak rate. According to the spectral continuity of the aggregated carriers, the CA may be divided into discontinuous carrier aggregation as illustrated in 101 of FIG. 1 and continuous carrier aggregation as illustrated in 102 of FIG. 1, According to whether frequency bands where the aggregated carriers are located are the same, the CA may be divided into Intra-band carrier aggregation and inter-band carrier aggregation. At 101 in FIG. 1, two discontinuous component carriers (component carrier A and component carrier B) are aggregated, the bandwidth of one component carrier is 20 MHz, and the total bandwidth after carrier aggregation is 40 MHz. At 102 in FIG. 1, five continuous carriers are aggregated, the bandwidth of one component carrier is 20 MHz, and the total bandwidth after carrier aggregation is 100 MHz.

The aggregated carriers support up to five CCs, that is, the maximum bandwidth after aggregation is 100 MHZ, and the aggregated carriers belong to the same base station. All aggregated carriers use the same cell radio network temporary identifier (C-RNTI), and the base station ensures that the C-RNTI does not conflict in each cell where a carrier is located.

Figure 2:
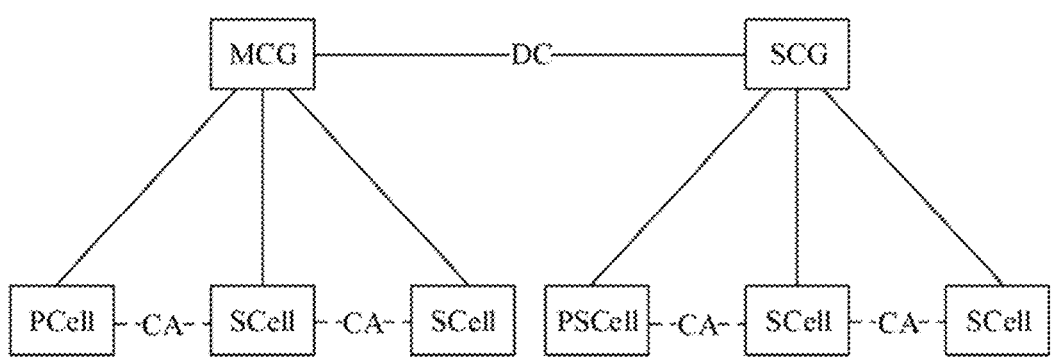
FIG. 2 is a schematic diagram of an alternative cell architecture for dual connectivity according to the present disclosure.

The dual connectivity network architecture may include a MCG and a SCG, as illustrated in FIG. 2. The MCG includes a PCell or additionally includes one or more SCells, and the SCG includes a PSCell or additionally includes one or more SCells. The PCell in the MCG and the SCell in the MCG are combined through the CA technology. The PSCell in the SCG and the SCell in the SCG are combined through the CA technology.

The PCell is a cell where a terminal device such as a user equipment (UE) performs initial connection establishment, or a cell where a radio resource control (RRC) connection reestablishment is performed, or a primary cell specified in a handover procedure. The PCell is responsible for RRC communication with the UE. A component carrier corresponding to the PCell is referred to as a primary component carrier (PCC). There is one and only one PCC, which provides an RRC signaling connection, a non-access stratum (NAS) function, security and the like. The physical uplink control channel (PUCCH) is on the PCC and only on the PCC.

The SCell is added at the time of RRC reconfiguration and configured for providing additional radio resources. A component carrier corresponding to the SCell is referred to as a secondary component carrier (SCC).

In early deployment of the NR, it is difficult to obtain a complete NR coverage, so typical network coverage is wide-area long term evolution (LTE) coverage and NR islanding coverage mode. Moreover, a large amount of LTE is deployed below 6 GHz, and there is little spectrum below 6 GHz available for the NR. Therefore, the spectrum application above 6 GHz must be studied for the NR, but in the high-frequency band, the coverage is limited and a signal fades rapidly. Meanwhile, in order to protect the previous investment of the mobile operator in LTE, a tight interworking operation mode between the LTE and the NR is proposed.

Figure 3:
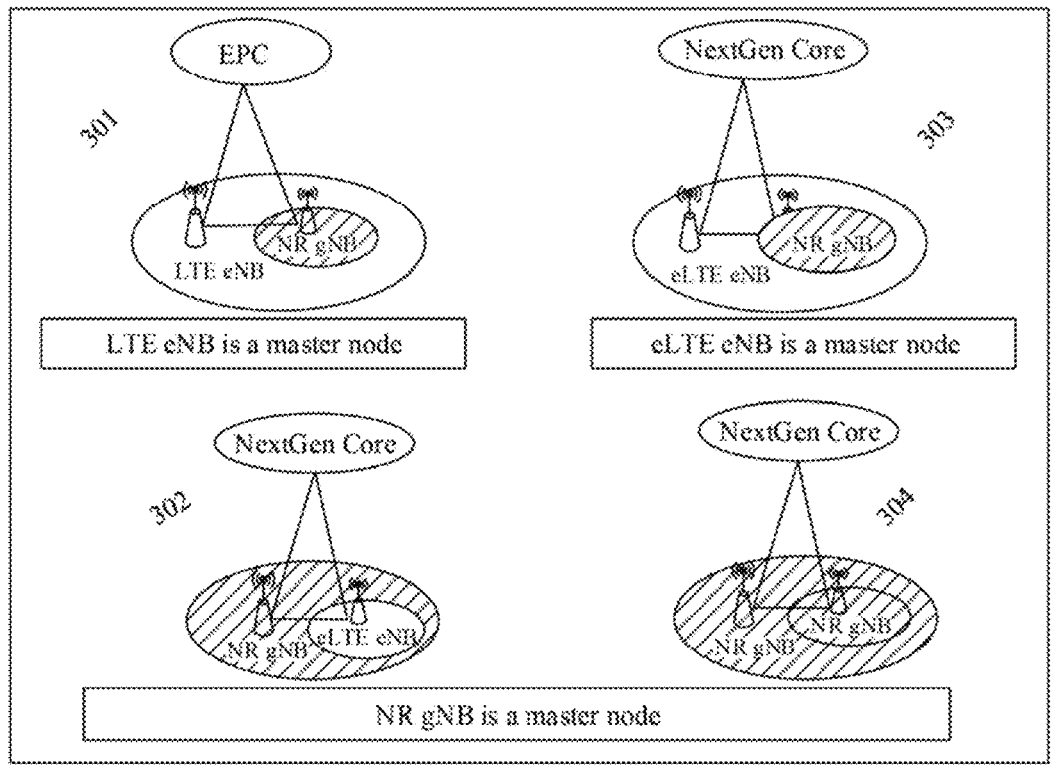
FIG. 3 is a schematic diagram of an alternative network architecture for dual connectivity according to the present disclosure.

In the tight interworking operation mode between the LTE and the NR, several architectures illustrated in FIG. 3 may be included: EN-DC, NE-DC, NGEN-DC and NR-DC architectures. E represents an evolved universal mobile telecommunications system (UMTS) terrestrial radio access network (E-UTRAN), that is, a 4G radio access network. N represents the NR, that is, the 5G new radio. NG represents a next-generation core network, that is, a 5G core network. The EN-DC is dual connectivity between the 4G radio access network and the 5G NR. The network deployment of the EN-DC architecture is illustrated as 301 in FIG. 3: Non Stand Alone (NSA) mode, and connects a 4G core network, that is, an evolved packet core network (EPC), in which an evolved Node B (eNB) of LTE is the master node and a 5G Node B (gNB) is the secondary node. The NE-DC is dual connectivity between the 5G NR and the 4G radio access network. The network deployment of the NE-DC architecture is illustrated as 302 in FIG. 3: NSA mode, and connects a core network of the enhanced LTE (eLTE), that is, a next-generation core network (NextGen Core), in which a gNB is the master node and an eNB is the secondary node. The NGEN-DC is dual connectivity between the 4G radio access network under the 5G core network and the 5G NR. The network deployment of the NGEN-DC architecture is illustrated as 303 in FIG. 3: NSA mode, and connects the next-generation core network, in which an eNB is the master node and a gNB is the secondary node. The NR-DC is dual connectivity between the 5G NR and the 5G NR. The network deployment of the NR-DC architecture is illustrated as 304 in FIG. 3: NSA mode, and connects the next-generation core network, in which a gNB is the master node and a gNB is the secondary node.

The master node is responsible for main RRC control functions and a control plane to the CN. The secondary node configures secondary signaling, such as SRB3, and mainly provides data transmission functions.

Figure 4:
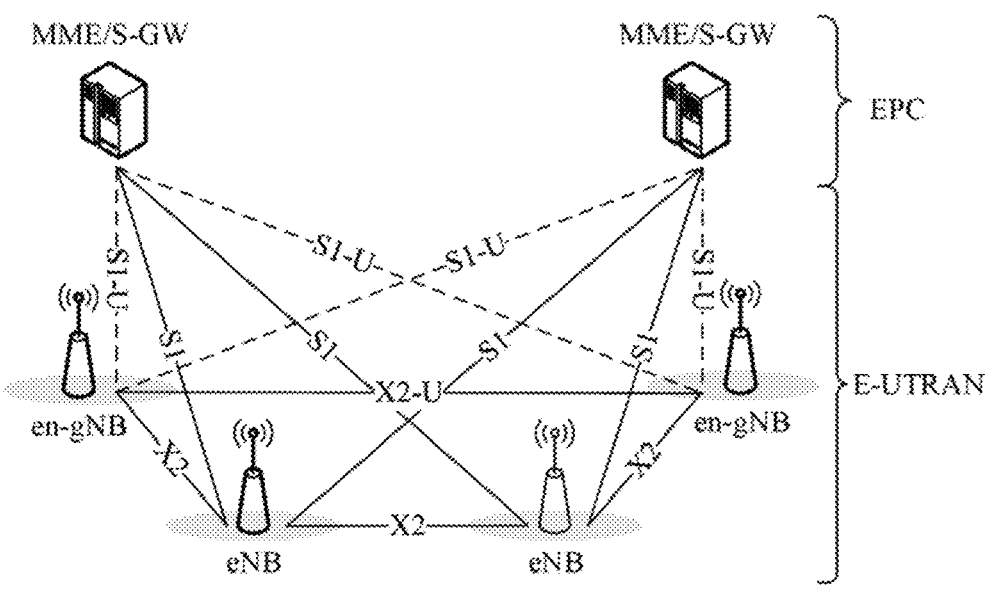
FIG. 4 is a schematic diagram of an alternative overall networking architecture for EN-DC according to the present disclosure.

In one example, an overall networking architecture for the EN-DC may be arranged as illustrated in FIG. 4, in which the access network is E-UTRAN, and base stations include 5G base station en-gNBs accessing the 4G core network and 4G base station eNBs. Network elements of the core network include a mobility management entity (MME)/serving gateway (S-GW). An interface between the en-gNB and the core network is referred to as S1-U interface, an interface between the eNB and the core network is referred to as S1 interface, an interface between the en-gNB and the eNB is referred to as X2 interface and an interface between the en-gNB and the en-gNB is referred to as X2-U interface.

In the Rel-15 standard, a scenario for dual connectivity of the E-UTRAN and the NR (MR-DC) supports an MN-triggered PSCell addition procedure, that is, an SN addition procedure, and meanwhile, supports a MN-triggered PSCell change procedure and SN-triggered PSCell change procedure both. PSCell change may occur within the same SN or between different SNs (i.e., between a source SN and a target SN).

Conditional Handover

As for the problems that handover in high-speed mobile scenarios and high-frequency deployment scenarios is frequent and easily fails, 3GPP is currently discussing introduction of conditional trigger-based handover procedure, that is, conditional handover, for LTE and NR systems. The basic principle of conditional handover is that when the terminal device evaluates that a trigger condition related to a target cell is triggered according to a trigger condition configured by a network side, the terminal device performs handover to the target cell according to a preconfigured handover command (that is, triggering the random access procedure and sending a handover complete message), so as to avoid that it is too late or unable to transmit a measurement report and receive a handover command due to high-speed movement of the terminal device into a poor coverage area.

Figure 5:
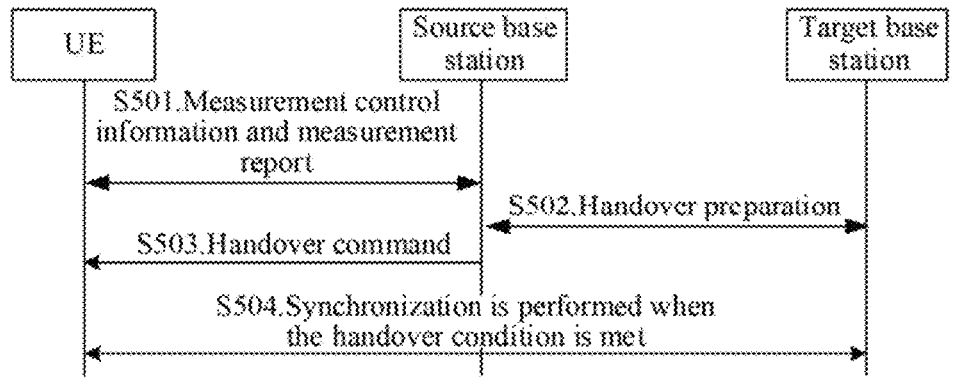
FIG. 5 is an alternative process flow diagram of conditional handover according to an embodiment of the present disclosure.

A method of conditional handover is illustrated in FIG. 5, which includes the following operations.

In 501, a source base station and a UE perform interaction of measurement control information and measurement report.

The source base station configures the measurement control information to the UE, so that the UE measures a mobility function under a control connection of the source base station. The UE transmits the measurement report according to a preset rule.

In 502, a target base station and the source base station perform handover preparation.

When the source base station determines that the UE has the possibility of handover based on a measurement result reported by the UE, the source base station perform handover preparation and send a request message for instructing to acquire the handover condition to the target base station.

In 503, the source base station sends a handover command carrying handover condition(s) to UE.

The handover command carries the handover condition sent by the target base station. The handover command may carry the handover conditions of one or more target base stations.

In 504, when the UE satisfies the handover condition, the UE is handed over to the target base station.

The Rel-16 mobility enhancement topic introduces the concept of conditional handover, which was initially introduced for PCell handover, and then conditional triggered-based PSCell addition/change was introduced for the MR-DC scenario.

After conditional triggered-based PSCell addition/change is introduced, PSCell addition/change is no longer completely controlled by the network, that is, the network side (i.e., a source MN and a source SN) cannot accurately know when the UE satisfies the condition to trigger the PSCell addition/change procedure. In this way, when RCC connection changes such as PCell handover or radio resource control connection reestablishment is performed based on the source primary cell, the UE is unable to be served through the DC mode since there is no coordination (for example, there is no X2/Xn interface) previously between a new MN and a SN where a new PSCell is located after the PSCell addition/change, which causes a system error.

Based on the above problems, the embodiments of the present disclosure provide a method for access control. The method for access control of the embodiments of the present disclosure may be applied to various communication systems, such as an LTE system, an LTE Frequency Division Duplex (FDD) system, an LTE Time Division Duplex (TDD) system, a Universal Mobile Telecommunication System (UMTS) communication system, a 5G system, a future communication system or the like.

Figure 6:
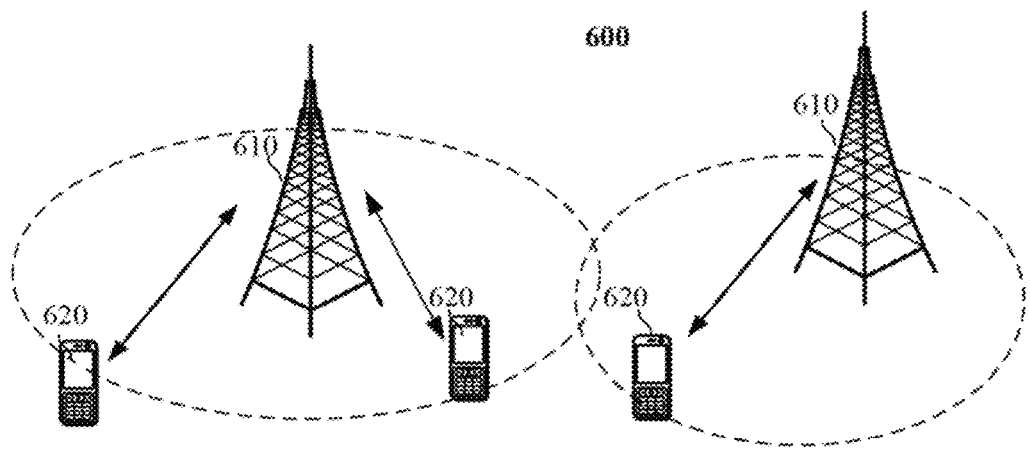
FIG. 6 is an alternative composition structure diagram of a communication system according to an embodiment of the present disclosure.

Exemplarily, a communication system 600 to which the embodiments of the present disclosure are applied is illustrated in FIG. 6. The communication system 600 may include a base station 610. The base station 610 may be a device communicating with a terminal device 620 (also referred to as a communication terminal, a terminal). The base station 610 may provide communication coverage for a specific geographic area and may communicate with a terminal device within the coverage area. In at least one example, the base station 610 may be an evolved NodeB (eNB or eNodeB) in the LTE system, may also be a gNB in the NR/5G system or a wireless controller in a Cloud Radio Access Network (CRAN), or the base station may be a mobile switching center, a relay station, an access point, a vehicle-mounted device, a wearable device, a hub, a switch, a bridge, a router, a network-side device in a 5G network, a base station in a future evolved Public Land Mobile Network (PLMN) or the like.

The communication system 600 also includes at least one terminal device 620 located within coverage of the base station 610. The "terminal device" used herein includes, but is not limited to, connection via wired lines, such as connection via Public Switched Telephone Networks (PSTN), Digital Subscriber Line (DSL), digital cables, direct cable; and/or another data connection/network; and/or via a wireless interface, such as for a cellular network, a Wireless Local Area Network (WLAN), a digital television networks such as DVB-H network, a satellite network, an AM-FM broadcast transmitters; and/or means of another terminal device arranged to receive/transmit a communication signal; and/or an Internet of Things (IoT) device. A terminal device configured to communicate via a wireless interface may be referred to as a "wireless communication terminal", "wireless terminal" or "mobile terminal". Examples of the mobile terminal include, but are not limited to, a satellite or cellular telephone, a Personal Communications System (PCS) terminal that may combine a cellular radio telephone with data processing, fax and data communications capability, a Personal Digital Assistant (PDA) that may include a radio telephone, a pager, Internet/intranet access, a Web browser, memo pad, calendar and/or Global Positioning System (GPS) receiver, and a conventional laptop and/or palmtop receiver or other electronic devices including a radio telephone transceiver. The terminal device may be referred to an access terminal, a User Equipment (UE), as subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a PDA, a handheld device with a wireless communication function, a computing device or another processing device connected to a wireless modem, a vehicle-mounted device, a wearable device, a terminal device in a 5G network, a terminal device in a future evolved PLMN or the like.

In one example, Device to Device (D2D) communication may be performed between the terminal devices 620.

FIG. 6 exemplarily illustrates two base stations and one terminal device. In one example, the communication system 600 may include multiple base stations and another number of terminal devices may be included within the coverage of each base station, which is not limited by the embodiments of the present disclosure.

When the terminal device is handed over from one base station to another base station, a base station before handover is referred to as the source base station and a base station after handover is referred to as the target base station. When the terminal device performs PCell handover, a base station covering the PCell before handover is referred to as the source MN and a base station covering the PCell after handover is referred to as the target MN. When the terminal device performs PSCell addition, a base station covering the added PSCell is referred to as the target SN. When the terminal device performs PSCell change, a base station covering the PSCell before change is referred to as the source SN and a base station covering the PSCell after change is referred to as the target SN.

In one example, the communication system 600 may also include other network entities such as a network controller or a mobility management entity, which is not limited in the embodiments of the present disclosure.

It is to be understood that a device with communication function in the network system in the embodiments of the present disclosure may be referred to as a communication device. Taking the communication system 600 illustrated in FIG. 6 as an example, the communication device may include the base station 610 and the terminal device 620 with the communication function. The base station 610 and the terminal device 620 may be specific devices mentioned above, and details are not described herein. The communication device may also include other devices in the communication system 600 for example, other network entities such as the network controller, the mobility management entity and the like, which is not limited in the embodiments of the present disclosure.

Figure 7:
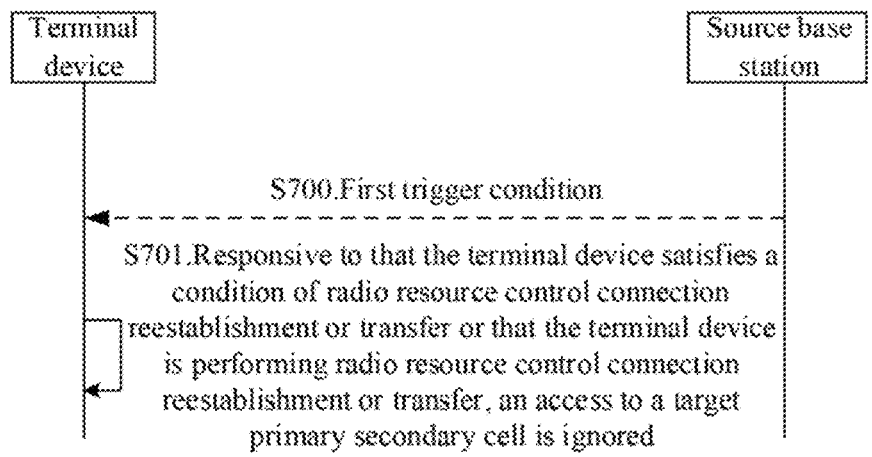
FIG. 7 is an alternative processing flow diagram of a method for access control according to an embodiment of the present disclosure.

The embodiments of the present disclosure provide an alternative process flow of a method for access control, which is illustrated in FIG. 7 and includes the following operations.

In S701, responsive to that a terminal device satisfies a condition of radio resource control connection reestablishment or transfer or that the terminal device is performing radio resource control connection reestablishment or transfer, the terminal device ignores an access to a target primary secondary cell.

The operation that terminal device ignores the access to the target primary secondary cell includes one of the following actions.

An ongoing access to the target primary secondary cell is terminated or suspended.

Responsive to that the terminal device satisfies a first trigger condition, no access to the target primary secondary cell that is to be performed is performed.

In one example, the procedure that the terminal device is performing radio resource control connection reestablishment is that the terminal device is performing access to a target primary cell through the radio resource control connection reestablishment procedure. In one example, the procedure that the terminal device is performing radio resource control connection transfer is that the terminal device is performing handover from a source primary cell to the target primary cell to access the target primary cell.

In one example, the terminal device is in a non-DC mode. The base station accessed by the terminal device in the non-DC mode only includes the MN. In one example, the terminal device is in a DC mode. Base stations accessed by the terminal device in the DC mode include the MN and the SN.

In one example, responsive to that the terminal device is performing an access procedure to the target PSCell and the condition of RRC reestablishment or transfer is satisfied, an ongoing access procedure to the target PSCell is terminated or suspended.

In one example, responsive to that the terminal device satisfies the first trigger condition and the condition of RRC reestablishment or transfer, the terminal device does not perform the access to the target primary secondary cell that is to be performed.

In one example, responsive to that the terminal device is performing radio resource control connection reestablishment or transfer and the terminal device satisfies the first trigger condition, the terminal device does not perform the access to the target primary secondary cell to be performed.

In one example, the operation that the ongoing access procedure to the target PSCell is terminated or terminated is triggered based on the first trigger condition.

In one example, the terminal device also performs at least one of the following operations.

Evaluation of whether the terminal device satisfies the first trigger condition is terminated or suspended.

Configuration information of the target primary secondary cell is released.

Configuration of the first trigger condition is released.

In one example, responsive to that the terminal device is performing the access procedure to the target PSCell and the condition of RRC reestablishment or transfer is satisfied, the ongoing access procedure to the target PSCell is terminated or terminated, the evaluation of whether the terminal device satisfies the first trigger condition is terminated or suspended and the configuration of the first trigger condition is released.

In one example, responsive to that the terminal device satisfies the first trigger condition and the condition of RRC reestablishment or transfer, the terminal device does not perform the access to the target primary secondary cell that is to be performed, the configuration information of the target primary secondary cell is released and the configuration of the first trigger condition is released.

In the embodiments of the present disclosure, before the terminal device performs the operation in S701, as illustrated in FIG. 7, the following operation may also be included.

In S700, the source base station configures the first trigger condition to the terminal device.

The first trigger condition is used to trigger the terminal device to access the target primary secondary cell. The first trigger condition includes a radio resource management (RRM) measurement event such as A3/A5/A4/B1.

In one example, the source base station is the source MN. In one example, the source base station is the source SN.

In one example, the terminal device is in the non-DC mode, and the first trigger condition is configured by the source MN through an RRC reconfiguration message.

When the source MN configures the first trigger condition for the terminal device, related configuration of the target PSCell is configured. At this time, the first trigger condition is used to trigger the terminal device to perform PSCell addition.

In one example, the terminal device is in the DC mode, and the first trigger condition is configured by a source master node through the radio resource control reconfiguration message on SRB1, or configured by a source secondary node through the radio resource control reconfiguration message on SRB3.

The source MN configures the first trigger condition and the related configuration of the target PSCell for the terminal device over the signaling radio bearer (SRB) 1 through the RRC reconfiguration message, or the source SN configures the first trigger condition and the related configuration of the target PSCell for the terminal device over the SRB3 through the RRC reconfiguration message. At this time, the first trigger condition is used to trigger the terminal device to perform PSCell addition or change, in which PSCell addition refers to adding a PSCell (that is, the target PSCell) to the terminal device, and PSCell change refers to changing a PSCell accessed by the terminal device from the source PSCell to the target PSCell.

In one example, the condition of radio resource control connection reestablishment includes that a radio link failure occurs to a radio link between the terminal device and the source primary cell.

Figure 8:
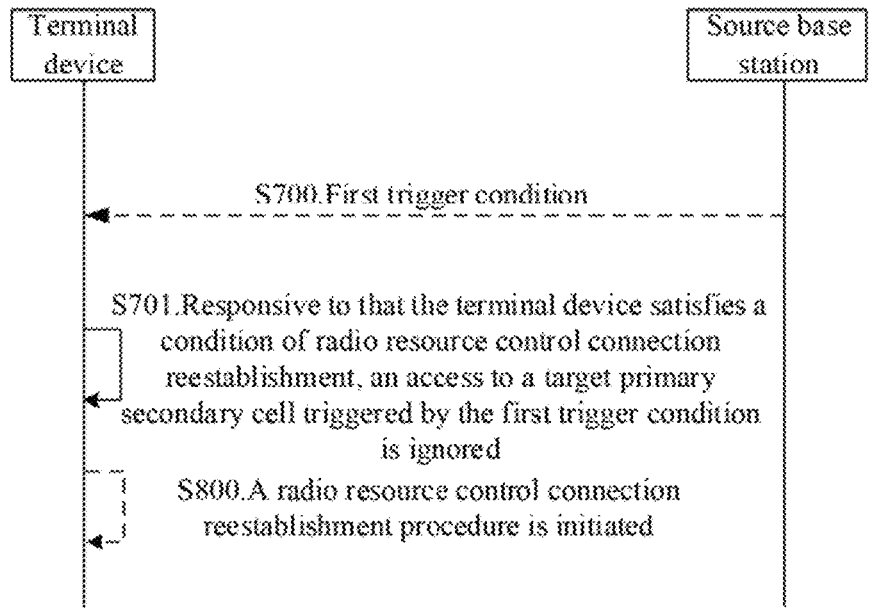
FIG. 8 is an alternative processing flow diagram of a method for access control according to an embodiment of the present disclosure.

In the embodiments of the present disclosure, when the radio link failure occurs to the radio link between the terminal device and the source primary cell, as illustrated FIG. 8, the terminal device may also perform the following operations.

In S800, the terminal device initiates the radio resource control connection reestablishment procedure.

The operation that the terminal device initiates the radio resource control connection reestablishment procedure is performed before or after the terminal device satisfies the first trigger condition.

In one example, as illustrated in FIG. 8, taking the case that the terminal device initiates the radio resource control connection reestablishment procedure before the terminal device satisfies the first trigger condition as an example, when the terminal device satisfies the first trigger condition during performing the radio resource control connection reestablishment procedure, the terminal device does not perform the access to the target primary secondary cell that is to be performed.

In one example, taking the case that the terminal device initiates the radio resource control connection reestablishment procedure after the terminal device satisfies the first trigger condition as an example, when the terminal device satisfies the first trigger condition, the terminal device performs access to the target primary secondary cell, and when the condition of radio resource control reestablishment is satisfied during the access procedure to the target PSCell, the terminal device terminates or suspends the ongoing access to the target PSCell and initiates the radio resource control connection reestablishment procedure. In another example, when the terminal device satisfies the first trigger condition and the condition of radio resource control connection reestablishment, the terminal device initiates the radio resource control connection reestablishment procedure and does not perform the access to the target primary secondary cell that is to be performed.

The terminal device initiates a cell selection procedure and transmits an RRC connection reestablishment request message to the selected cell to reestablish an RRC connection with the network. The cell selected by the terminal device is referred to as the target primary cell and the RRC connection with the target primary cell in the network is reestablished. The target primary cell and the source primary cell may be the same cell or different cells.

In one example, the condition of radio resource control connection transfer includes a condition of handover for the terminal device from the source primary cell to the target primary cell.

In one example, the condition of handover from the source primary cell to the target primary cell includes at least one of the following.

A handover command for instructing the terminal device to hand over from the source primary cell to the target primary cell is received from the source primary cell.

A second trigger condition for triggering handover of the terminal device from the source primary cell to the target primary cell is satisfied.

The source primary cell and the target primary cell may be cells covered by the same base station, or may be cells covered by different base stations, respectively.

When the handover condition is that the handover command for instructing the terminal device to hand over from the source primary cell to the target primary cell is received from the source primary cell, the terminal device receives the handover command from the source primary base station covering the source primary cell, and the handover command instructs the primary cell of the terminal device to handed over from the present source primary cell to the target primary cell.

When the handover condition is that a second trigger condition for triggering handover of the terminal device from the source primary cell to the target primary cell is satisfied, the terminal device stores the second trigger condition configured by the source base station and configuration information related to the target primary cell.

The second trigger condition is configured for the terminal device by the source MN through the RRC reconfiguration message.

The source MN configures the second trigger condition for PCell handover and related configuration of the target PCell to the terminal device through the RRC reconfiguration message. The second trigger condition may include a RRM measurement event such as A3/A5.

Figure 9:
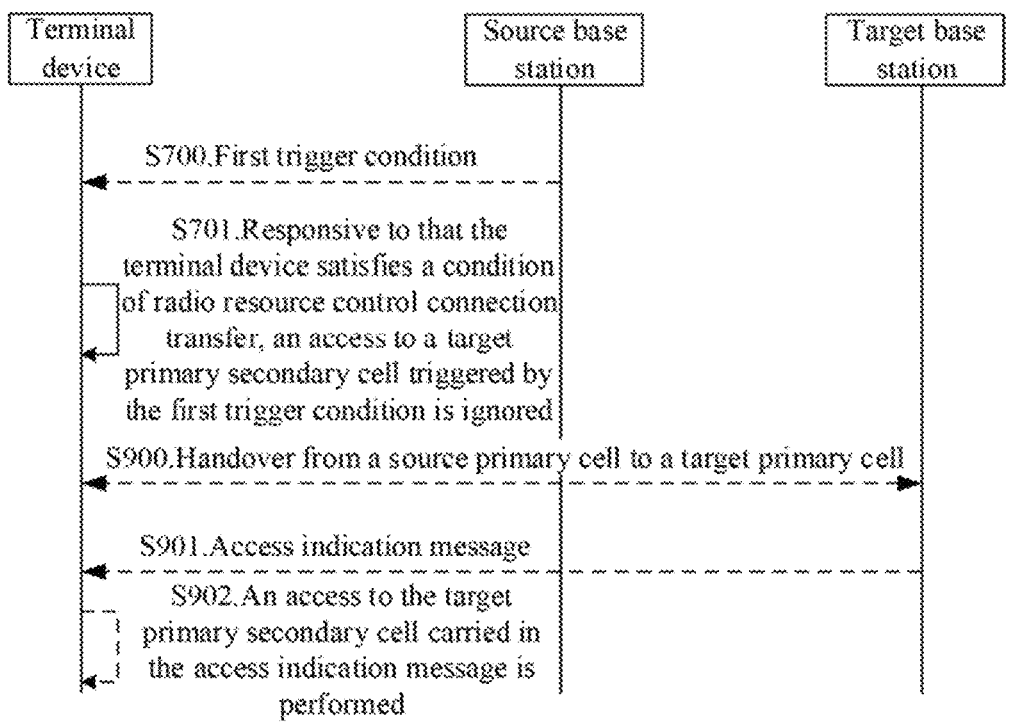
FIG. 9 is an alternative processing flow diagram of a method for access control according to an embodiment of the present disclosure.

In the embodiment of the present disclosure, when the terminal device satisfies the condition of handover from the source primary cell to the target primary cell, as illustrated in FIG. 9, the terminal device may also performs the following operation.

In S900, the terminal device performs handover from the source primary cell to the target primary cell.

The terminal device performs handover of the primary cell between the source base station and the target base station, and hand over the source primary cell to the target primary cell, so as to migrate a radio link between the terminal device and the source primary cell to a radio link between the terminal device and the target primary cell.

The terminal device starts to perform handover from the source primary cell to the target primary cell before or after the terminal device satisfies the first trigger condition.

In one example, as illustrated in FIG. 9, taking that the terminal device starts to perform handover from the source primary cell to the target primary cell before the terminal device satisfies the first trigger condition as an example, when the first trigger condition is met during handover of the terminal device from the source primary cell to the target primary cell, the terminal device does not perform the access to the target primary secondary cells that is to be performed.

In one example, taking that the terminal device starts to perform handover from the source primary cell to the target primary cell after the terminal device satisfies the first trigger condition as an example, when the first trigger condition is met, the terminal device performs access to the target primary secondary cell, and when the radio resource control connection transfer condition is met during the access to the target primary secondary cell, terminates or suspends the ongoing access to the target primary secondary cell and performs handover from the source primary cell to the target primary secondary cell. In another example, responsive to that the terminal device satisfies the first trigger condition and the condition of the radio resource control connection transfer, the terminal device starts to perform handover from the source primary cell to the target primary cell and does not perform access to the target primary secondary cell that is to be performed.

In the embodiments of the present disclosure, when the terminal device may establish a radio connection with a new primary cell due to the change of the radio resource control connection, such as the terminal device occurs an RRC connection failure, handover of the primary cell is required to be performed or the like, the terminal device ignores the PSCell addition/change triggered based on the first trigger condition, and avoids that there is no interface between an MN covering the new PCell and an SN covering the new PSCell, thereby ensuring that the dual connectivity function of the terminal device is normal.

In one example, the terminal device performs access to the target primary secondary cell after the first trigger condition is met. During performing the access to the target primary secondary cell, when the terminal device detects the RRC connection failure, receives the handover command or satisfies the second trigger condition, the terminal device terminates the ongoing access to the target primary secondary cell, releases the related configuration of the target PSCell and the configuration of the first trigger condition, and initiates the RRC connection reestablishment procedure or performs handover to the target primary cell.

In one example, the terminal device detects the RRC connection failure, receives the handover command or satisfies the second trigger condition, in condition that the terminal device satisfies the first trigger condition for triggering access to the target primary secondary cell (PSCell) during handover to the target primary cell or initiation of the RRC connection reestablishment, related configuration of the target PSCell and the first trigger condition configuration are released.

Taking that the ongoing access to the target primary secondary cell is terminated or suspended and the terminal device satisfies the condition of radio resource control connection reestablishment as an example, the terminal device performs access to the target primary secondary cell after the first trigger condition is met, and continues to monitor a radio link of the source primary cell during performing the access to the target primary secondary cell. Responsive to that a radio link failure occurs to the radio link of the source primary cell, the ongoing access to the target primary secondary cell is terminated and the RRC connection reestablishment procedure is initiated.

Taking that the ongoing access to the target primary secondary cell is terminated and the terminal device satisfies the condition of radio resource control connection transfer as an example, the terminal device performs access to the target primary secondary cell after the first trigger condition is met. During the access to the target primary secondary cell and before the access to the target primary secondary cell is successful, when the terminal device receives the handover command from the source primary cell or satisfies the second trigger condition, the terminal device terminates the ongoing access to the target primary secondary cell, restores the configuration of the source primary secondary cell and immediately performs handover to the target primary cell.

Taking that the terminal device, when satisfying the first trigger condition, does not perform the access to the target primary secondary cell that is to be performed and the terminal device satisfies the condition of radio resource control connection reestablishment as an example, the terminal device monitors a radio link of the currently accessed primary cell. Responsive to that a radio link failure occurs to the radio link of the source primary cell, the terminal device initiates the RRC connection reestablishment procedure, and does not perform access to the target primary secondary cell that is to be performed when the first trigger condition for triggering access to the target primary secondary cell is satisfied during initiation of the RRC connection reestablishment procedure to the reestablished cell.

Taking that the terminal device, when satisfying the first trigger condition, does not perform the access to the target primary secondary cell that is to be performed and the terminal device satisfies the condition of radio resource control connection reestablishment as an example, the terminal device monitors the radio link of the source primary cell. When the radio link failure occurs to the radio link of the source primary cell and the first trigger condition for triggering access to the target primary secondary cell is satisfied, the terminal device does not perform the access to the target primary secondary cell that is to be performed is performed, and initiates the RRC connection reestablishment procedure.

Taking that the terminal device, when satisfying the first trigger condition, does not perform the access to the target primary secondary cell that is to be performed and the terminal device satisfies the condition of radio resource control connection transfer as an example, when the terminal device receives the handover command or satisfies the second trigger condition, the terminal device performs handover to the target primary cell, and does not perform the access to the target primary secondary cell that is to be performed in condition that the first trigger condition for triggering access to the target primary secondary cell is satisfied during the handover to the target primary cell.

Taking that the terminal device, when satisfying the first trigger condition, does not perform the access to the target primary secondary cell that is to be performed and the terminal device satisfies the condition of radio resource control connection transfer as an example, when the terminal device receives the handover command or satisfies the second trigger condition and satisfies the first trigger condition for triggering access to the target primary secondary cell, the terminal device performs handover to the target primary cell and does not perform the access to the target primary secondary cell that is to be performed.

In the embodiments of the present disclosure, when the terminal device performs RRC connection reestablishment to access the target primary cell or handover to the target primary cell, the terminal device transmits indication information for indicating that the terminal device satisfies the first trigger condition to the target primary cell.

A base station covering the target primary cell (that is, the target base station) receives from the terminal device indication information for indicating that the terminal device satisfies the first trigger condition. The first trigger condition is used to trigger the terminal device to access the target primary secondary cell, and the target primary cell is accessed by the terminal device under the following conditions.

In condition that the terminal device satisfies the condition of radio resource control connection reestablishment or transfer, the terminal device ignores the access to the target primary secondary cell triggered by the first trigger condition.

In the embodiments of the present disclosure, satisfaction occasion indicated by the indication information is before or after the terminal device performs handover from the source primary cell to the target primary cell. The satisfaction occasion is an occasion that the terminal device satisfies the first trigger condition.

Taking that the satisfaction occasion indicated by the indication information is before the terminal device performs handover from the source primary cell to the target primary cell as an example, the terminal device performs the access procedure to the target primary secondary cell when satisfying the first trigger condition, and when the condition of handover from the source cell to the target primary cell is satisfied during the access procedure to the target primary secondary cell, the terminal device terminates the ongoing access to the target primary secondary cell, performs handover to the target primary cell and sends indication information for indicating that the terminal device satisfies the first trigger condition to the target primary cell.

Taking that the satisfaction occasion indicated by the indication information is after the terminal device performs handover from the source primary cell to the target primary cell as an example, when the terminal device satisfies the condition of handover from the source cell to the target primary cell, the terminal device performs handover to the target primary cell, and when the terminal device satisfies the first trigger condition in the handover process, the terminal device does not perform access to the target primary secondary cell that is to be performed and triggered based on the first trigger condition, and sends the indication information for indicating that the terminal device satisfies the first trigger condition to the target primary cell.

In one example, the indication information is carried in the following message: a radio resource control reestablishment complete message or a radio resource control reconfiguration complete message transmitted to the target primary cell; or, a radio resource control message transmitted to the target primary cell after the radio resource control reestablishment complete message or the radio resource control reconfiguration complete message.

The radio resource control reconfiguration complete message is used to instruct the terminal device to complete handover to the target primary cell.

In one example, when the terminal device initiates RRC reestablishment, the indication information is carried into the radio resource control reestablishment complete message in the RRC reestablishment procedure, or the indication information is carried into the radio resource control message after the RRC reestablishment procedure is completed.

In one example, when the terminal device performs the PCell handover procedure, the indication information is carried into the radio resource control reconfiguration complete message in the PCell handover procedure, or the indication information is carried in the radio resource control message after the PCell handover procedure is completed.

In one example, the indication information includes at least one of a frequency point of the target primary secondary cell or a physical cell identity of the target primary secondary cell.

In the embodiments of the present disclosure, in a case that the terminal device transmits the indication information to the target primary cell, as illustrated in FIG. 9, the method also includes the following operations.

In S901, the target base station delivery an access indication message for instructing the terminal device to access the target primary secondary cell to the terminal device.

At this time, the terminal device receives from the target primary cell the access indication message for instructing the terminal device to access the target primary secondary cell.

The access indication message carries an access identifier for instructing the terminal device to access the target primary secondary cell. In one example, the access indication message is RRC signaling.

The target MN transmits an SN addition/change request to the target SN, the target SN transmits configuration information of a new PSCell to the target MN through an acknowledgement message, and the target MN transmits the configuration information of the new PSCell to the terminal device through the RRC signaling to complete new PSCell addition or change.

The new PSCell carried in the RRC signaling may be the same as the target PSCell corresponding to the first trigger condition or may be a different cell.

In S902, the terminal device performs access to the target primary secondary cell carried in the access indication message.

In one example, the RRC signaling includes the RRC reconfiguration message.

Exemplarily, based on different change manners of the radio resource control connection between the terminal device and the source primary cell and different handover to the target primary secondary cell, the method for access control provided by the aspects of the present disclosure may include the following scenarios.

Scenario 1, reception of a PCell handover command terminates an ongoing PSCell addition/change procedure.

Scenario 2, a conditional PCell handover procedure terminates or suspends the ongoing PSCell addition/change procedure.

Scenario 3, when a condition of PCell handover and a condition of PSCell addition/change are simultaneously satisfied, the PCell handover procedure is performed, and the PSCell addition/change procedure is not performed.

Scenario 4, a PCell radio link failure terminates or suspends the ongoing PSCell addition/change procedure and triggers RRC connection reestablishment.

It should be noted that the above four scenarios are exemplary descriptions of the application scenarios, and the method for access control provided by the embodiments of the present disclosure may also include other application scenarios, and details are not described herein.

According to the method for access control provided by the embodiments of the present disclosure, responsive to that the terminal device satisfies the condition of RRC connection reestablishment or transfer, the terminal device ignores access to the target primary secondary cell triggered based on the first trigger condition, so as to avoid that there is no X2/Xn interface between a new PCell and a newly-accessed PSCell when the terminal device connects to the new PCell in a scenario where RRC connection changes, such as RRC connection reestablishment or implementation of the PCell handover. Therefore, the method avoids that dual connectivity is unable to be implemented in a new master node, and ensure that the access of the terminal device to the target primary secondary cell does not affect the service provided by dual connectivity for the terminal device, thereby ensuring service performance of the network and improving user experience.

Taking the communication system being an NR/5G system as an example, the method for access control provided by the embodiments of the present disclosure is illustrated below through different examples.

First Example

Figure 10:
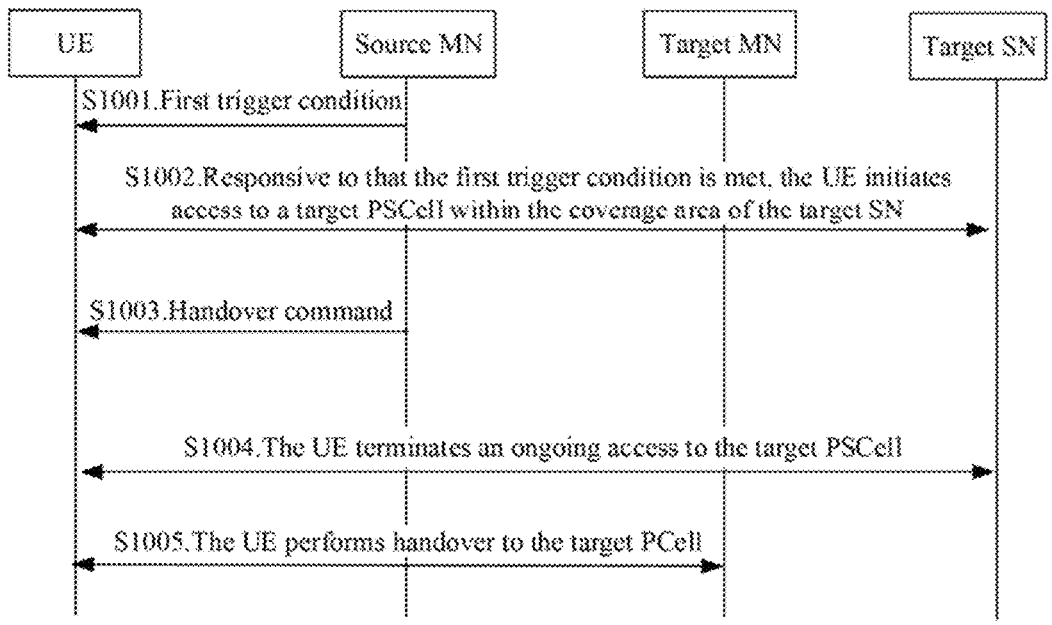
FIG. 10 is an alternative processing flow diagram of a method for access control according to an embodiment of the present disclosure.

In the first example, an ongoing conditional trigger-based PSCell addition/change procedure is terminated based on receipt of a PCell handover command, as illustrated in FIG. 10, which includes the following operations.

In S1001, a source MN configures a first trigger condition for an active UE.

The first trigger condition is a trigger condition for PSCell addition/change.

In S1001, the source base station also configures related configuration of the PSCell for the active UE.

a. When the UE is in a non-DC mode (i.e., only an MN), the source MN configures the trigger condition for PSCell addition and related configuration of a target PSCell for the UE through a RRC reconfiguration message. The trigger condition may include a radio resource management (RRM) measurement event such as A3/A5/A4/B1.

b. When the UE is in a DC mode (i.e., an MN and a SN), the trigger condition for PSCell change and the related configuration of the target PSCell may be configured by the source MN to the UE through the RRC reconfiguration message on SRB1, or configured by the source SN to the UE through the RRC reconfiguration message on SRB3.

In S1002, responsive to that the first trigger condition is met, the UE initiates access to the target PSCell within the coverage area of the target SN.

In S1003-S1004, the UE continues to receive a RRC message from the source MN when the UE accesses the target PSCell. In condition that the UE receives the PCell handover command from the source MN when the target PSCell has not been successfully accessed (for example, the random access has not succeeded), the UE terminates the ongoing access to the target PSCell and restores the source PSCell configuration.

In S1005, the UE is handed over to the target PCell within the coverage of the target MN.

After the UE terminates the ongoing access to the target PSCell and restores the source PSCell configuration, the UE performs immediately the PCell handover procedure to handover from the source PCell to the target PCell.

In the first example, when the PSCell configuration is not included in the PCell handover command, the UE continues to use the source PSCell configuration after handover is performed. When a new PSCell configuration (e.g., a new PSCell is replaced) is indicated in the PCell handover command, the UE applies the new PSCell configuration after the handover is performed.

In the first example, the conditional trigger-based PSCell addition/change is automatically triggered by the UE side according to the condition evaluation, without absolute control of the network side. The ongoing conditional trigger-based PSCell addition/change procedure is terminated by the PCell handover, which ensures that mobility of the connectivity state is completely controlled by the network side, and avoids that the UE is unable to be served through the DC mode since after the PCell handover and PSCell addition/change are performed simultaneously, there is no coordination (for example, there is no X2/Xn interface) previously between the new target PSCell cell and the target MN after the handover, thereby resulting in a system error.

Second Example

Figure 11:
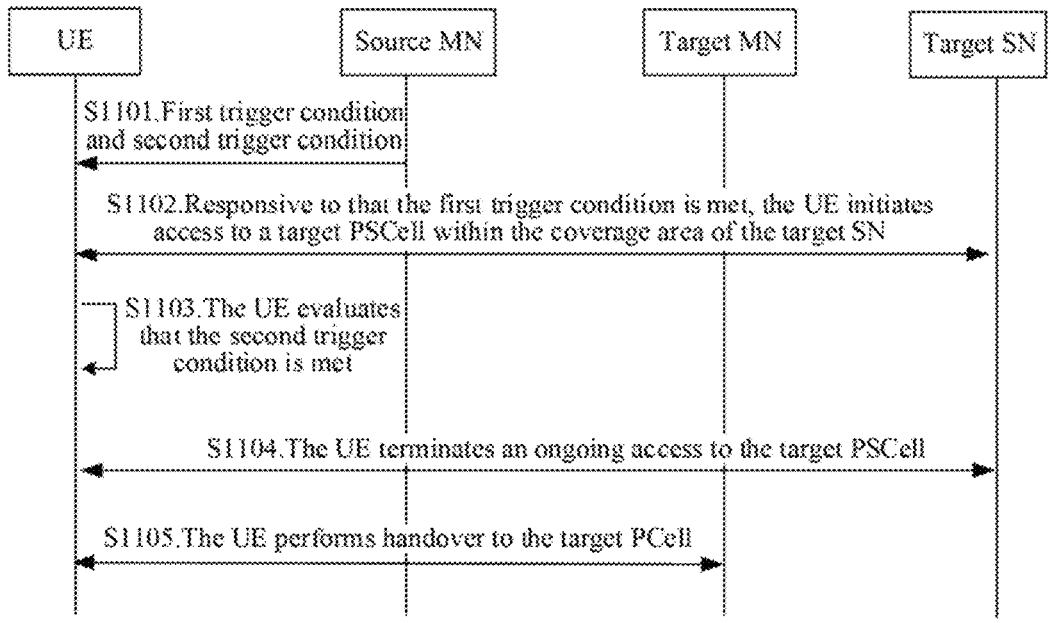
FIG. 11 is an alternative processing flow diagram of a method for access control according to an embodiment of the present disclosure.

In the second example, the ongoing conditional trigger-based PSCell addition/change procedure is terminated based on a PCell conditional handover procedure, as illustrated in FIG. 11.

In S1101, a source MN configures a first trigger condition and a second trigger condition for an active UE.

The first trigger condition is a trigger condition for PSCell addition/change, and the second trigger condition is a trigger condition for PCell handover.

In S1101, the source base station also configures related configuration of the PCell and related configuration of the PSCell for the active UE.

a. The source MN configures the trigger condition for PCell handover and related configuration of a target PSCell for the UE through a RRC reconfiguration message. The trigger condition may include a RRM measurement event, such as A3/A5.

b. When the UE is in a non-DC mode (i.e., only an MN), the source MN configures the trigger condition for PSCell addition and the related configuration of the target PSCell for the UE through the RRC reconfiguration message. The trigger condition may include a RRM measurement event, such as A3/A5/A4/B1.

c. When the UE is in a DC mode (i.e., an MN and a SN), the trigger condition for the PSCell change and the related configuration of the target PSCell may be configured by the source MN to the UE through the RRC reconfiguration message on SRB1, or configured by the source SN to the UE through the RRC reconfiguration message over SRB3.

In S1102, responsive to that the first trigger condition is met, the UE initiates access to the target PSCell within the coverage area of the target SN.

In S1003-S1004, the UE continues to receive a RRC message from the source MN when the UE accesses the target PSCell. In condition that the UE side evaluates a second trigger condition is met when the target PSCell has not been successfully accessed (for example, the random access has not succeeded), the UE terminates the ongoing access to the target PSCell and restores the source PSCell configuration.

In S1005, the UE is handed over to the target PCell within the coverage of the target MN.

After the UE terminates the ongoing access to the target PSCell and restores the source PSCell configuration, the UE performs immediately the PCell handover procedure to handover from the source PCell to the target PCell.

In the second example, the conditional trigger-based PCell handover and the conditional trigger-based PSCell addition/change are two separate procedures, and there is a conflict between the two procedures. For example, there may be no X2/Xn interface between the target MN where the target PCell of the conditional trigger-based PCell handover is located and the target SN where the target PSCell of the conditional trigger-based PSCell addition/update is located. The ongoing conditional trigger-based PSCell addition/change procedure is terminated based on the PCell handover, which avoids that the UE is unable to be served through the DC mode since after the PCell handover and PSCell addition/change are performed simultaneously, there is no coordination previously between the new target PSCell cell and the target MN after the handover, thereby resulting in a system error.

Third Example

Figure 12:
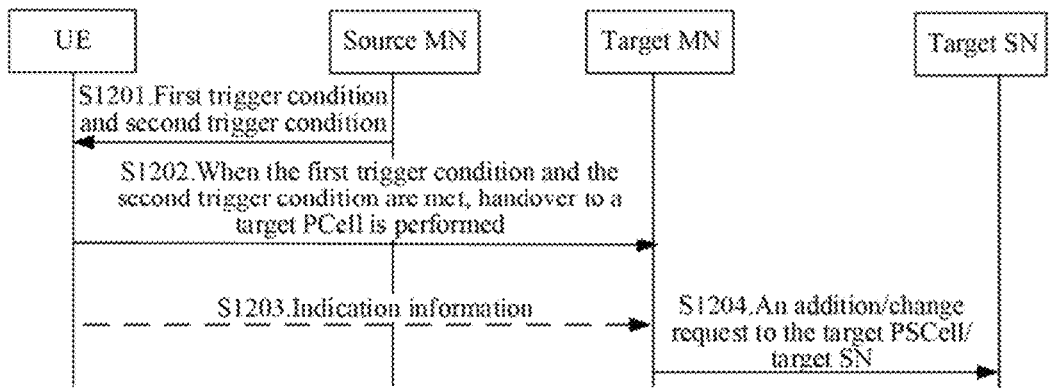
FIG. 12 is an alternative processing flow diagram of a method for access control according to an embodiment of the present disclosure.

In the third example, a PCell handover procedure is performed when a trigger condition for the PCell handover and a trigger condition for the PSCell addition/change are simultaneously satisfied. As illustrated in FIG. 12, the method includes the following operations.

In S1201, a source MN configures a first trigger condition and a second trigger condition for an active UE.

The first trigger condition is a trigger condition for PSCell addition/change, and the second trigger condition is a trigger condition for PCell handover.

In S1201, the source base station also configures related configuration of the PCell and related configuration of the PSCell for the active UE.

In S1202, when the first trigger condition and the second trigger condition are simultaneously met, the PCell handover procedure is performed for handover to a target PCell within the coverage area of a target MN.

When the trigger condition for PSCell addition/change and the trigger condition for PCell handover are simultaneously satisfied, the UE does not initiate access to the target PCell and the target PSCell simultaneously. The UE ignores the fact that the trigger condition for the PSCell addition/change has been satisfied, and initiates access to the target PCell using the related configuration of PCell conditional handover according to the fact that the trigger condition for the PCell handover is satisfied.

In S1203, the UE reports indication information for indicating that the target PSCell satisfies the condition of PSCell addition/change to the target PCell/MN after the PCell handover is completed.

a. The indication information may include a frequency point of the target PSCell and physical cell identity (PCI) information.

b. The indication information may be carried in a handover complete message (e.g., an RRCReconfiguration-Complete message).

c. The indication information may be carried in an RRC message (e.g., a ULInformationTransfer message) after the RRCReconfigurationComplete message.

In S1204, the target MN may immediately initiate a target PSCell addition/change request to the target SN, using the indication information, for the UE to add or change the PSCell.

In the third example, the PCell handover and the PSCell addition/change are not performed simultaneously, enabling to avoid a system error, and meanwhile, an available target PSCell is reported immediately after the PCell handover is completed, which assists a new MN to immediately initiate new PSCell addition or change and avoids introduction of an additional delay due to the need of reconfiguring measurement and receiving a measurement report by the network, thereby rapidly entering DC configuration and improving the user experience.

Fourth Example

Figure 13:
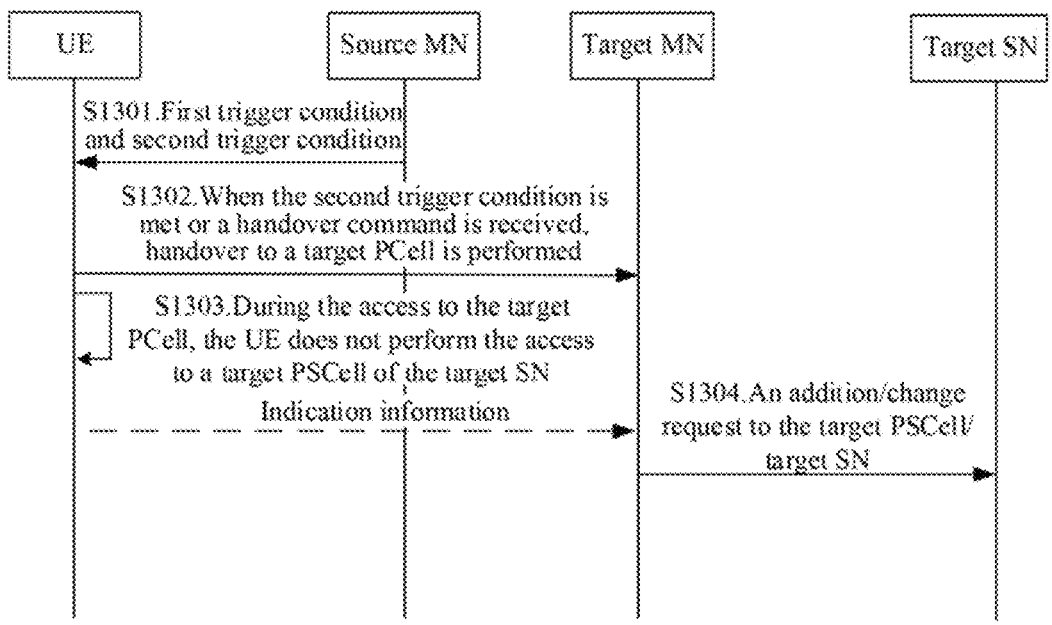
FIG. 13 is an alternative processing flow diagram of a method for access control according to an embodiment of the present disclosure.

In the fourth example, when the condition for PSCell addition/change is satisfied during the PCell handover/conditional handover being performed, the PCell handover procedure is performed. As illustrated in FIG. 13, the method includes the following operations.

In S1301, a source MN configures a first trigger condition and a second trigger condition for an active UE.

In S1302, when the trigger condition for PCell handover is met or the UE receives a PCell handover command, the UE initiates access to a target PCell within the coverage area of a target MN.

In S1303, during the access to the target PCell, the UE does not perform the access to a target PSCell of a target SN.

As for the PSCell addition/change when the UE initiates assess to the target PCell, the operation that the UE does not perform the access to the target PSCell of the target SN includes the following processing manners.

a. The UE stops evaluation of the trigger condition for PSCell addition/change, and/or releases related configuration of the target PSCell.

b. The UE continues the evaluation of the trigger condition and does not perform the PSCell addition/change procedure when the trigger condition is satisfies.

In condition that the UE continues the evaluation of the trigger condition, the UE may report indication information for indicating that the target PSCell satisfies the condition for PSCell addition/change to the target PCell/MN after the PCell handover is completed.

a. The indication information may be carried in a handover complete message (e.g., an RRCReconfigurationComplete message).

b. The indication information may be carried in an RRC message (e.g., a ULInformationTransfer message) after the RRCReconfigurationComplete message.

In S1304, the target PCell/MN may immediately initiate a target PSCell/SN addition/update request to the SN, using the report information, for the UE to add or change the PSCell.

In the fourth example, the PCell handover and the PSCell addition/change are not performed simultaneously, enabling to avoid a system error, and meanwhile, an available target PSCell is reported immediately after the handover is completed, which assists a new MN to immediately initiate new PSCell addition or change and avoids introduction of an additional delay due to the need of reconfiguring measurement and receiving a measurement report by the network, thereby rapidly entering DC configuration and improving the user experience.

Fifth Example

Figure 14:
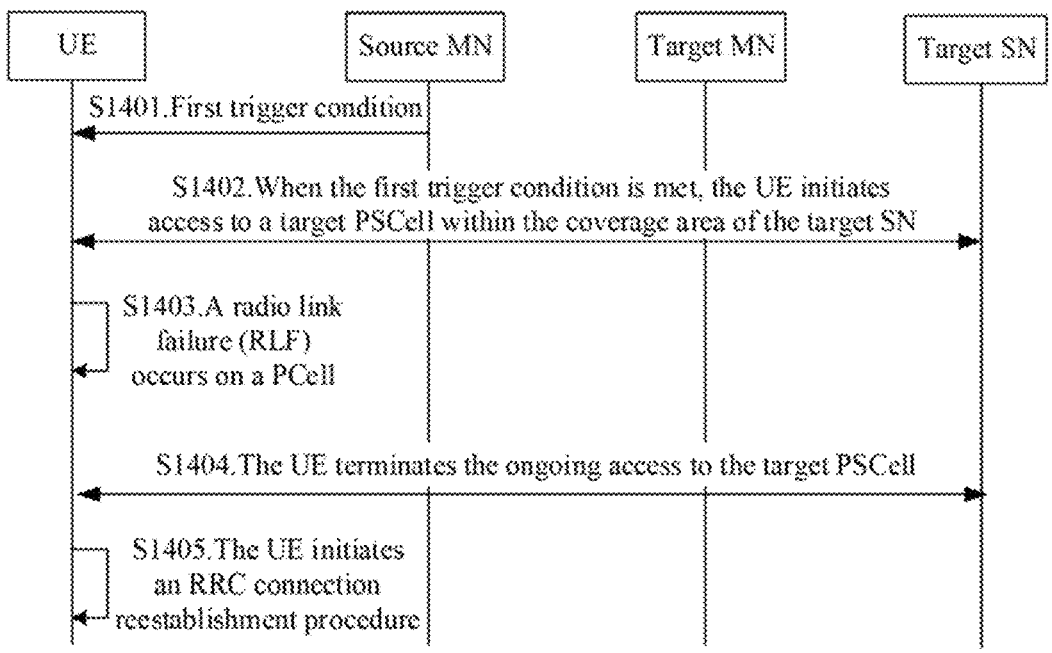
FIG. 14 is an alternative processing flow diagram of a method for access control according to an embodiment of the present disclosure.

In the fifth example, a PCell radio link failure terminates an ongoing PSCell addition/change procedure and triggers RRC connection reestablishment. As illustrated in FIG. 14, the method includes the following operations.

In S1401, a source MN configures a first trigger condition for an active UE.

In S1402, when the first trigger condition is met, the UE initiates access to a target PSCell within the coverage area of a target SN.

In S1403-S1404, during performing the PSCell addition/change procedure, the UE continues to perform radio link monitoring (RLM) on the PCell. When a radio link failure (RLF) occurs on the PCell, the UE terminates the ongoing PSCell addition/change procedure.

In S1405, the UE initiates an RRC connection reestablishment procedure.

Before the operation in S1405, the UE may release related configuration of the target PSCell.

In the fifth example, the PCell radio link failure terminates the ongoing PSCell addition/change procedure, which can avoids that the DC is unable to be operated under the new MN since there is no X2/Xn interface/coordination between the new MN/PCell and the target PSCell when the UE is reestablished to the new MN/PCell.

Figure 15:
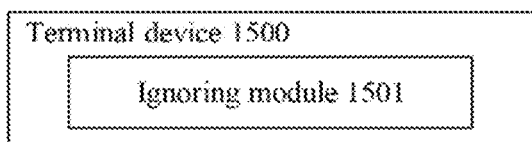
FIG. 15 is an alternative structural diagram of a terminal device according to an embodiment of the present disclosure.

To implement the method for access control mentioned above, the embodiments of the present disclosure provide a terminal device 1500. As illustrated in FIG. 15, the terminal device 1500 includes an ignoring module 1501.

The ignoring module 1501 is configured to, in condition that the terminal device satisfies a condition of radio resource control connection reestablishment or transfer or that the terminal device is performing radio resource control connection reestablishment or transfer, terminate or suspend an ongoing access to a target primary secondary cell, or perform no access to the target primary secondary cell that is to be performed responsive to that the terminal device satisfies a first trigger condition.

In the embodiments of the present disclosure, the ignoring module 1501 is also configured to perform at least one of the following operations: terminating or suspending evaluation of whether the terminal device satisfies the first trigger condition, releasing configuration information of the target primary secondary cell, or releasing configuration of the first trigger condition.

In the embodiments of the present disclosure, the condition of radio resource control connection reestablishment includes that a radio link failure occurs in a radio link between the terminal device and a source primary cell.

In the embodiments of the present disclosure, the terminal device also includes a connection reestablishment module.

The connection reestablishment module is configured to initiate a radio resource control connection reestablishment procedure.

In the embodiments of the present disclosure, the condition of radio resource control connection transfer includes a condition of handover from a source primary cell to a target primary cell.

In the embodiments of the present disclosure, the condition of handover from the source primary cell to the target primary cell includes at least one of the following conditions.

A handover command for instructing the terminal device to hand over from the source primary cell to the target primary cell is received from the source primary cell.

A second trigger condition for triggering handover of the terminal device from the source primary cell to the target primary cell is satisfied.

In the embodiments of the present disclosure, the terminal device also includes a handover module.

The handover module is configured to perform handover from the source primary cell to the target primary cell.

In the embodiments present disclosure, the terminal device also includes a reporting module.

The reporting module is configured to transmit indication information for indicating that the terminal device satisfies the first trigger condition to the target primary cell.

In the embodiments of the present disclosure, satisfaction occasion indicated by the indication information is before or after the terminal device performs handover from the source primary cell to the target primary cell. The satisfaction occasion is an occasion that the terminal device satisfies the first trigger condition.

In the embodiments of the present disclosure, the indication information is carried in the following message: a radio resource control reestablishment complete message or a radio resource control reconfiguration complete message transmitted to the target primary cell, or a radio resource control message transmitted to the target primary cell after the radio resource control reestablishment complete message or the radio resource control reconfiguration complete message.

In the embodiments of the present disclosure, the indication information includes at least one of a frequency point of the target primary secondary cell or a physical cell identity of the target primary secondary cell.

In the embodiments of the present disclosure, the terminal device also includes a first receiving module and an access module.

The first receiving module is configured to receive an access indication message for instructing the terminal device to access the target primary secondary cell from the target primary cell.

The access module is configured to perform access to the target primary secondary cell based on the access indication message.

In the embodiments of the present disclosure, when the terminal device is in a dual connectivity mode, the first trigger condition is configured by the following modes.

The first trigger condition is configured by a source master node through a radio resource control reconfiguration message on SRB1.

The first trigger condition is configured by a source secondary node through the radio resource control reconfiguration message on SRB3.

The embodiments of the present disclosure also provide a terminal device, which includes a processor and a memory for storing a computer program executable on the processor. The processor, when running the computer program, executes the operations of the above method for access control executed by the terminal device.

Figure 16:
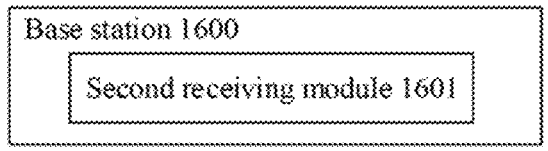
FIG. 16 is an alternative structural diagram of a base station according to an embodiment of the present disclosure.

The embodiments of the present disclosure also provide a base station 1600. As illustrated in FIG. 16, the base station includes a second receiving module 1601.

The second receiving module 1601 is configured to receive indication information for indicating that the terminal device satisfies a first trigger condition from a terminal device. The first trigger condition is used to trigger the terminal device to access a target primary secondary cell.

The base station covers a target primary cell accessed by the terminal device, and the target primary cell is accessed by the terminal device under the following conditions.

Responsive to that a condition of radio resource control connection reestablishment or transfer is satisfied or that the terminal device is performing radio resource control connection reestablishment or transfer, an ongoing access to the target primary secondary cell is terminated or suspended, or the access to the target primary secondary cell that is to be performed is not performed in condition that the terminal device satisfies the first trigger condition.

In the embodiments of the present disclosure, the indication information is carried in the following message: a radio resource control reestablishment complete message or a radio resource control reconfiguration complete message transmitted by the terminal device, or a radio resource control message transmitted by the terminal device after the radio resource control reestablishment complete message or the radio resource control reconfiguration complete message.

In the embodiments of the present disclosure, the indication information includes at least one of a frequency point of the target primary secondary cell or a physical cell identity of the target primary secondary cell.

In the embodiments of the present disclosure, the base station also includes a delivering module.

The delivering module is configured to deliver an access indication message for instructing the terminal device to access the target primary secondary cell to the terminal device.

The embodiments of the present disclosure may also provide a base station. The base station includes a processor and a memory for storing a computer program executable on the processor. The processor, when running the computer program, executes the operations of the above method for access control executed by the base station.

Figure 17:
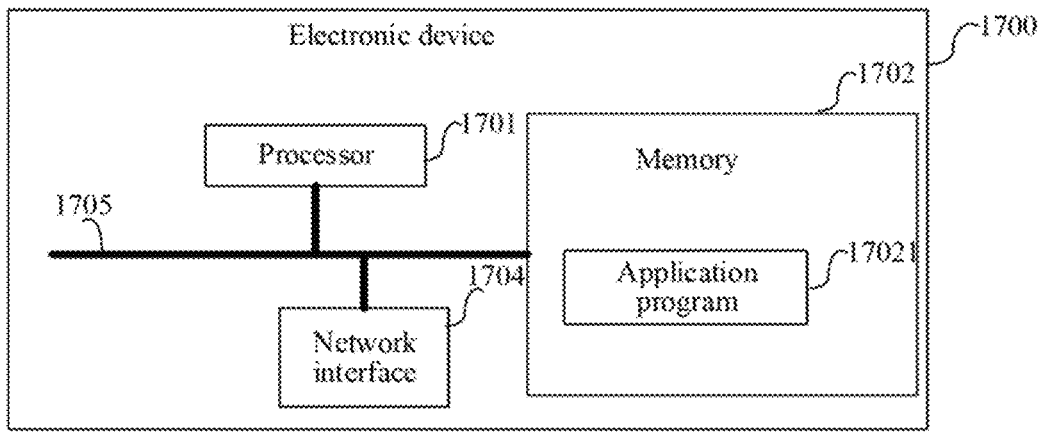
FIG. 17 is an alternative structural diagram of an electronic device according to an embodiment of the present disclosure.

FIG. 17 is a schematic diagram of a hardware structure of an electronic device (terminal device or base station) according to the embodiments of the present disclosure. The electronic device 1700 includes at least one processor 1701, a memory 1702, and at least one network interface 1704. The various components in the electronic device 1700 are coupled together by a bus system 1705. It is to be understood that the bus system 1705 is used to implement connection communication between these components. The bus system 1705 includes a data bus, and also includes a power bus, a control bus and a status signal bus. For clear description, however, various buses are labeled as the bus system 1705 in FIG. 17.

It is to be understood that the memory 1702 may be a volatile memory or a non-volatile memory, and may include the volatile memory and the non-volatile memory. The non-volatile memory may be an ROM, a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk or a compact disc read-only memory (CD-ROM). The magnetic surface memory may be a magnetic disk memory or a magnetic tape memory. The volatile memory may be a random access memory (RAM) and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRA). The memory 1702 described in embodiments of the present disclosure is intended to include but not limited to memories of these and any other suitable type.

The memory 1702 in embodiments of the present disclosure is used to store various types of data to support the operation of the electronic device 1700. Examples of such data include any computer program for operating on the electronic device 1700, such as the application program 17021. The program for implementing the method of the embodiments of the present disclosure may be included in the application program 17021.

The method disclosed in the above embodiments of the present disclosure may be applied to or implemented by the processor 1701. The processor 1701 may be an integrated circuit chip with a signal processing capability. In an implementation process, each operation of the above method may be completed by an integrated logical circuit of hardware in the processor 1701 or an instruction in a software form. The processor 1701 may be a universal processor, a Digital Signal Processor (DSP) or another programmable logic device, discrete gate or transistor logic device and discrete hardware component. Each method, step and logical block diagram disclosed in the embodiments of the disclosure may be implemented or executed by the processor 1701. The universal processor may be a microprocessor or the processor may also be any conventional processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a storage medium. The storage medium is located in the memory 1702. The processor 1701 reads information in the memory 1702, and completes the operations of the above methods in combination with hardware of the processor.

In an exemplary embodiment, the electronic device 1700 may be implemented by one or more Application Specific Integrated Circuits (ASICs), DSPs, Programmable Logic Devices (PLD), Complex Programmable Logic Devices (CPLD), FPGAs, universal processors, controllers, MCUs, MPUs, or other electronic components for performing the above methods.

The embodiments of the present disclosure also provide a storage medium for storing a computer program.

In one example, the storage medium may be applied in the terminal device of the embodiments of the present disclosure. The computer program may enable a computer to perform the corresponding process in each method of the embodiments of the disclosure, which will not be elaborated herein for brief description.

In one example, the storage medium may be applied to the base station of the embodiments of the present disclosure. The computer program may enable a computer to perform the corresponding process in each method of the embodiments of the disclosure, which will not be elaborated herein for brief description.

The present disclosure is described with reference to flowcharts and/or block diagrams of a method, a device (system) and a computer program product according to the embodiments of the present disclosure. It is to be understood that each process and/or block in the flowcharts and/or block diagrams and combinations of process and/or block in the flowcharts and/or block diagrams may be implemented by one or more computer program instructions. These computer program instructions may be provided to a processor of a universal computer, dedicated computer, embedded processor or other programmable data processing device to produce a machine, to enable the instructions executed by the processor of the computer or other programmable data processing device to produce a device that implements one or more functions specified in one process or multiple processes in the flowchart and/or one block or multiple blocks in the block diagram.

These computer program instructions may also be stored in a computer readable memory capable of directing a computer or other programmable data processing device to operate in a particular manner, to enable the instructions stored in the computer readable memory to produce an manufacture including an instruction device that implements one or more functions specified in one process or multiple processes in the flowchart and/or one block or multiple blocks in the block diagram.

These computer program instructions may also be loaded onto a computer or other programmable data processing device, to enable a series of operation steps to be performed on the computer or other programmable device to produce a computer-implemented process, such that the instructions executed on the computer or other programmable device provide operations for implementing the functions specified in one process or multiple processes in the flowchart and/or one block or multiple blocks in the block diagram.

The above is only the preferred implementation of the disclosure and not intended to limit the scope of protection of the disclosure. Any modification, equivalent replacement and improvement made within the spirit and principles of the present disclosure are intended to be included within the scope of the present disclosure.

The invention claimed is:

1. A method for access control, comprising:
responsive to that a terminal device satisfies a condition of radio resource control connection reestablishment to a primary cell during performing an ongoing access procedure to a target primary secondary cell, terminating, by the terminal device, the ongoing access procedure to the target primary secondary cell; and
responsive to that the terminal device satisfies a first trigger condition during performing a radio resource control connection reestablishment procedure to the primary cell, performing, by the terminal device, no access procedure to the target primary secondary cell that is to be performed, the first trigger condition being used to trigger the terminal device to access the target primary secondary cell.

2. The method of claim 1, wherein the terminal device further performs at least one of:
terminating or suspending evaluation of whether the terminal device satisfies the first trigger condition;
releasing configuration information of the target primary secondary cell; or releasing configuration of the first trigger condition.

3. The method of claim 1, wherein the condition of radio resource control connection reestablishment comprises:
a radio link failure occurs to a radio link between the terminal device and a source primary cell.

4. The method of claim 1, further comprising:
initiating, by the terminal device, the radio resource control connection reestablishment procedure to establish a radio resource control connection with a target primary cell.

5. A terminal device, comprising:
a processor; and
a memory for storing a computer program executable on the processor,
wherein the processor is configured to:
responsive to that the terminal device satisfies a condition of radio resource control connection reestablishment to a primary cell during performing an ongoing access procedure to a target primary secondary cell, terminate the ongoing access procedure to the target primary secondary cell, and
responsive to that the terminal device satisfies a first trigger condition during performing a radio resource control connection reestablishment procedure to the primary cell, perform no access procedure to the target primary secondary cell that is to be performed, the first trigger condition being used to trigger the terminal device to access the target primary secondary cell.

6. The terminal device of claim 5, wherein the processor is further configured to perform at least one of:
terminating or suspending evaluation of whether the terminal device satisfies the first trigger condition;
releasing configuration information of the target primary secondary cell; or releasing configuration of the first trigger condition.

7. The terminal device of claim 5, wherein the condition of radio resource control connection reestablishment comprises:
a radio link failure occurs to a radio link between the terminal device and a source primary cell.

8. The terminal device of claim 5, wherein the processor is further configured to:
initiate the radio resource control connection reestablishment procedure to establish a radio resource control connection with a target primary cell.

* * * * *